(12) United States Patent
Nosaka

(10) Patent No.: US 7,422,616 B2
(45) Date of Patent: Sep. 9, 2008

(54) SUSPENSION TYPE DAMPER UNIT, SUCTION TYPE POWDER COLLECTOR, AND AIR MIXING SUCTION TYPE POWDER COLLECTOR

(75) Inventor: Masaaki Nosaka, Hirakata (JP)

(73) Assignee: KabushikiKaisha Matsui Seisakusho, Osaka (JP)

( * ) Notice: Subject to any disclaimer, the term of this patent is extended or adjusted under 35 U.S.C. 154(b) by 530 days.

(21) Appl. No.: 11/065,634

(22) Filed: Feb. 23, 2005

(65) Prior Publication Data
US 2005/0205152 A1 Sep. 22, 2005

(30) Foreign Application Priority Data
Feb. 24, 2004 (JP) ............... 2004-047532

(51) Int. Cl.
*B01D 35/30* (2006.01)
(52) U.S. Cl. ....................... 55/432; 414/288
(58) Field of Classification Search ............ 55/432, 55/433; 414/288
See application file for complete search history.

(56) References Cited

U.S. PATENT DOCUMENTS 4,081,110 A 3/1978 Evans
4,947,903 A 8/1990 Beckwith
6,111,211 A * 8/2000 Dziedzic et al. .......... 200/61.2

FOREIGN PATENT DOCUMENTS

| DE | 33 27 461 | 2/1985 |
|---|---|---|
| DE | 40 38 901 | 7/1991 |
| GB | 1 433 954 | 4/1976 |
| GB | 2 091 671 | 8/1982 |

* cited by examiner

*Primary Examiner*—Robert A. Hopkins
(74) *Attorney, Agent, or Firm*—William L. Androlia; H. Henry Koda

(57) ABSTRACT

A suspension type damper unit, a suction type powder collector and an air mixing suction type powder collector are disclosed, which have a cover plate suspended at a material discharge port thereof with a suspension member so as to form a space for the material discharge port. In these apparatus, the cover plate functions to close the material discharge port by receiving suction force by which a powdered material is fed into the material collector and opens the material discharge port by receiving the weight of the specified amount of the powdered material which is stored in the material collector.

9 Claims, 5 Drawing Sheets

SUSPENSION TYPE DAMPER UNIT, SUCTION TYPE POWDER COLLECTOR, AND AIR MIXING SUCTION TYPE POWDER COLLECTOR

FIELD OF THE INVENTION

The present invention relates to a suspension type damper unit, a suction type powder collector, and an air mixing suction type powder collector in which a powdered or granular material such as a synthetic resin material is pneumatically transferred.

PRIOR ART

There has been proposed a suction type powder collector constructed such that a material supply port is provided at the upper part of the collector body, a discharge port with a damper unit is provided at the lower part of the body, a suction air is operated from an air suction port provided at an appropriate part of the body when the material discharge port is closed, and a powdered or granular material is stored in the collector body.

Also there has been proposed an air mixing suction type powder collector comprising a material mixing chamber having an air suction port at its upper part, a material discharge port at its lower part and a material storage chamber and a communicating pipe for connecting the material mixing chamber to the material storage chamber, in which a powdered material fed through the material supply port by suction force acting on the air suction port is stored by the specified amount in the material mixing chamber while the powdered material is mixed with air in the material mixing chamber and thereafter is transferred into the material storage chamber by opening the damper.

The damper unit of the above-mentioned suction type powder collector and the air mixing suction type powder collector (called as suction type collector and so on hereinafter) has been constructed such that a cover for closing the material discharge port is provided at a free edge of a driving arm and a balance weight is provided at a base edge side via a supporting point of the driving arm (see JP-A-9-26333).

In addition to the damper unit, or in place of the balancing weight, a solenoid or a sensor may be used to open and close the cover.

When the suction force is acted on the air suction port, the cover of the damper unit located at the lower part of the material discharge port is moved up to the collector body by the suction force to close the material discharge port and to make the inner pressure in the collector body negative, so that the powdered or granular material is supplied from the material supply port by the suction force to be stored in the collector body.

On the other hand, a fixed amount of powdered or granular material is stored in the collector body and the torque caused by the load applied on the cover exceeds the torque by the balance weight, the cover goes down to open the material discharge port, so that the fixed amount of material stored in the collector body falls to be discharged.

However, according to the above-mentioned damper unit of the prior suction type powder collector, the balance weight or the driving arm mentioned above are required, or a cable is required for sending electric signals in case of providing a solenoid and a sensor. Therefore, there has been a problem such that the structure is complicated and the whole apparatus becomes large.

The complication of the structure may cause many breakdowns as well as many malfunctions of the mechanism due to the open and close operations of the cover.

SUMMARY OF THE INVENTION

The object of the present invention is to solve the above-mentioned problems and to provide a suspension type damper unit, a suction type powder collector, and an air mixing suction type powder collector in which the structure is mechanically simplified and the apparatus is made compact and weight saving by means of a newly invented structure such that the cover plate of the damper unit is suspended with a suspension member.

In order to achieve the above-mentioned objects, the suspension type damper unit, the air suction type powder collector and the air mixing suction type powder collector according to the present invention are newly constructed such that a cover plate which is opened or closed by the suction force is suspended with a suspension member so as to have a fixed space with a material discharge port.

The suspension member in this specification should be able to deform such that the cover plate is smoothly moved into an open position when the cover plate receives the load of the powdered or granular material and such that the cover plate returns its designated waiting position after the powdered or granular material is discharged. The suspension member may be made of a single material or a combination of plural materials, and further any mechanism may be applied. In case of the combination, the suspension member may be suspended and supported with a multi joint mechanism.

The simplest example is such a structure utilizing the principal of pendulum that a cover plate is suspended with a flexible material like two thin wires or cords, the cover plate is balanced where a fixed space is formed with the material discharge port at its designated waiting position, the cover plate is moved to the open position by the load of the powdered or granular material when the material is discharged, and the cover plate is returned to the designated waiting position after the discharge.

When the stored amount exceeds the suction force because the powdered or granular material becomes a fixed amount when the material is suck into the collector body or the suction force is stopped, the cover plate which is closing the material discharge port is opened to drop and discharge the stored material.

The cover plate is moved to the moved position evacuated from the designated waiting position (called "open position") by the load of falling powdered or granular material when the material is discharged, and the cover plate is returned to its designated waiting position by the gravity after the material in the collector body is discharged.

Accordingly, the cover plate is simply constructed, thereby achieving a small and light weight mechanism.

In addition, the number of breakdowns are reduced and mechanical malfunctions caused by the open and close operations of the cover plate are prevented by the simple structure.

Further according to the suspension type damper unit of the air suction type powder collector and the air mixing suction type powder collector of the present invention, the material discharge port and the cover plate are inclined in the same direction so as to have a fixed space therebetween. Therefore, the moving direction of the cover plate is specified and the discharging direction and the discharging position of the powdered or granular material are also specified.

Still further according to the suspension type damper unit of the air suction type powder collector and the air mixing suction type powder collector of the present invention, the suspension member is returned to its waiting position after the powdered or granular material are discharged. The oscillation of the suspension member is regulated by a stopper, so that the cover plate is quickly stopped at the waiting position, thereby improving the return efficiency.

The effects of the present invention are as follows.

According to the suspension type damper unit, the air suction type powder collector and the air mixing suction type powder collector of the present invention, the cover plate is suspended t with the suspension member so as to have a fixed space with the material discharge port, thereby achieving a simple mechanism, and a small and light weight apparatus.

Further because of its simple mechanism, breakdowns are reduced and mechanical malfunctions caused by the open and close operations of the cover plate are prevented.

Further according to the suspension type damper unit, the air suction type powder collector and the air mixing suction type powder collector of the present invention, the moving direction of the cover plate is specified and the discharging direction and the discharging position of the powdered or granular material are also specified.

Still further according to the suspension type damper unit, the air suction type powder collector and the air mixing suction type powder collector of the present invention, the suspension member is quickly stopped at the waiting position, thereby improving the return efficiency.

DETAILED DESCRIPTION OF THE INVENTION

Now, a suspension type damper unit A and a suction type powder collector B according to the present invention are explained referring to the attached drawings.

Embodiment 1

Figure 1:
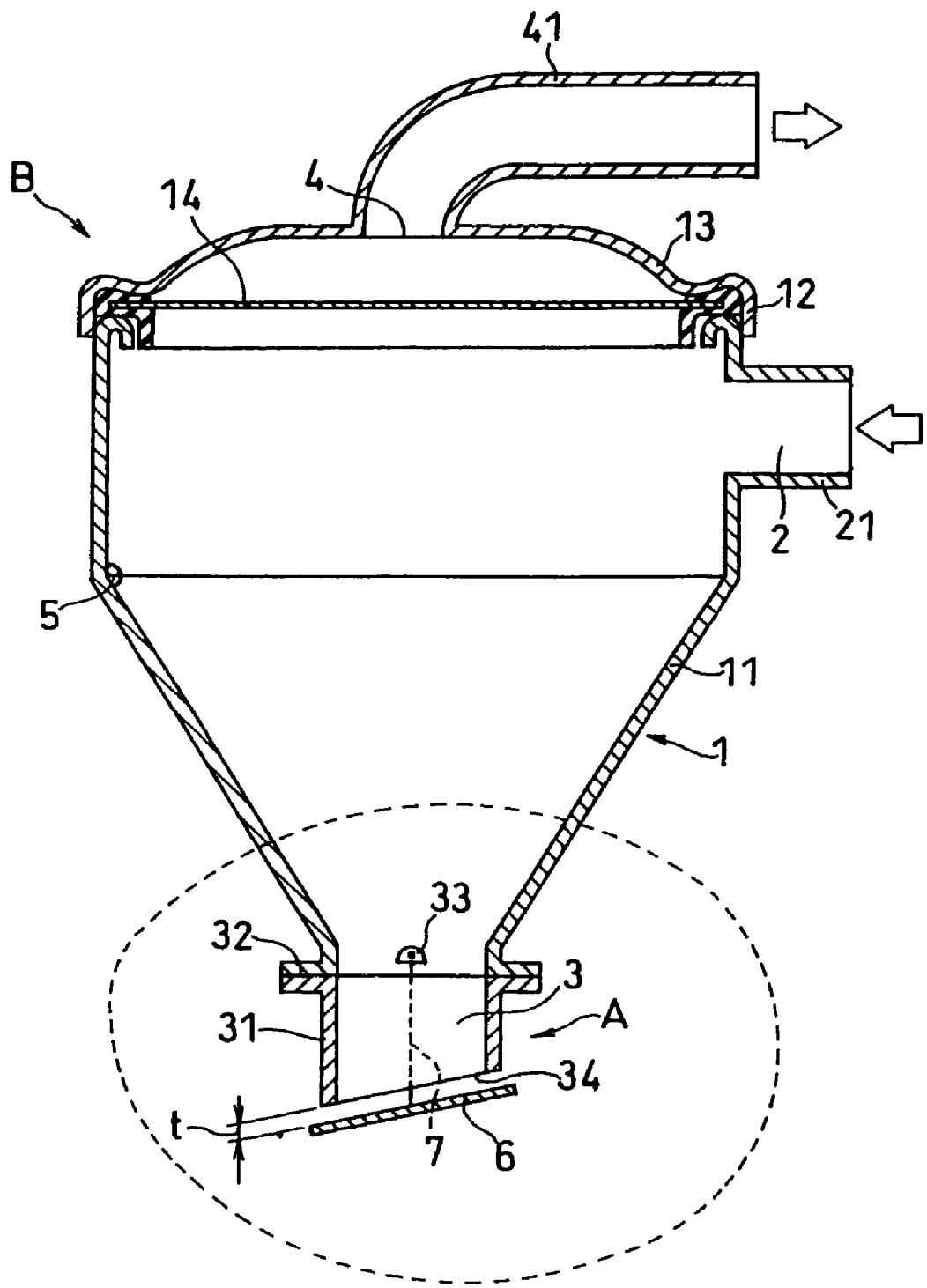
FIG. 1 is a diagrammatical whole sectional view showing one embodiment of a suspension type damper unit A and a suction type powder collector B according to the present invention.
Figure 2:
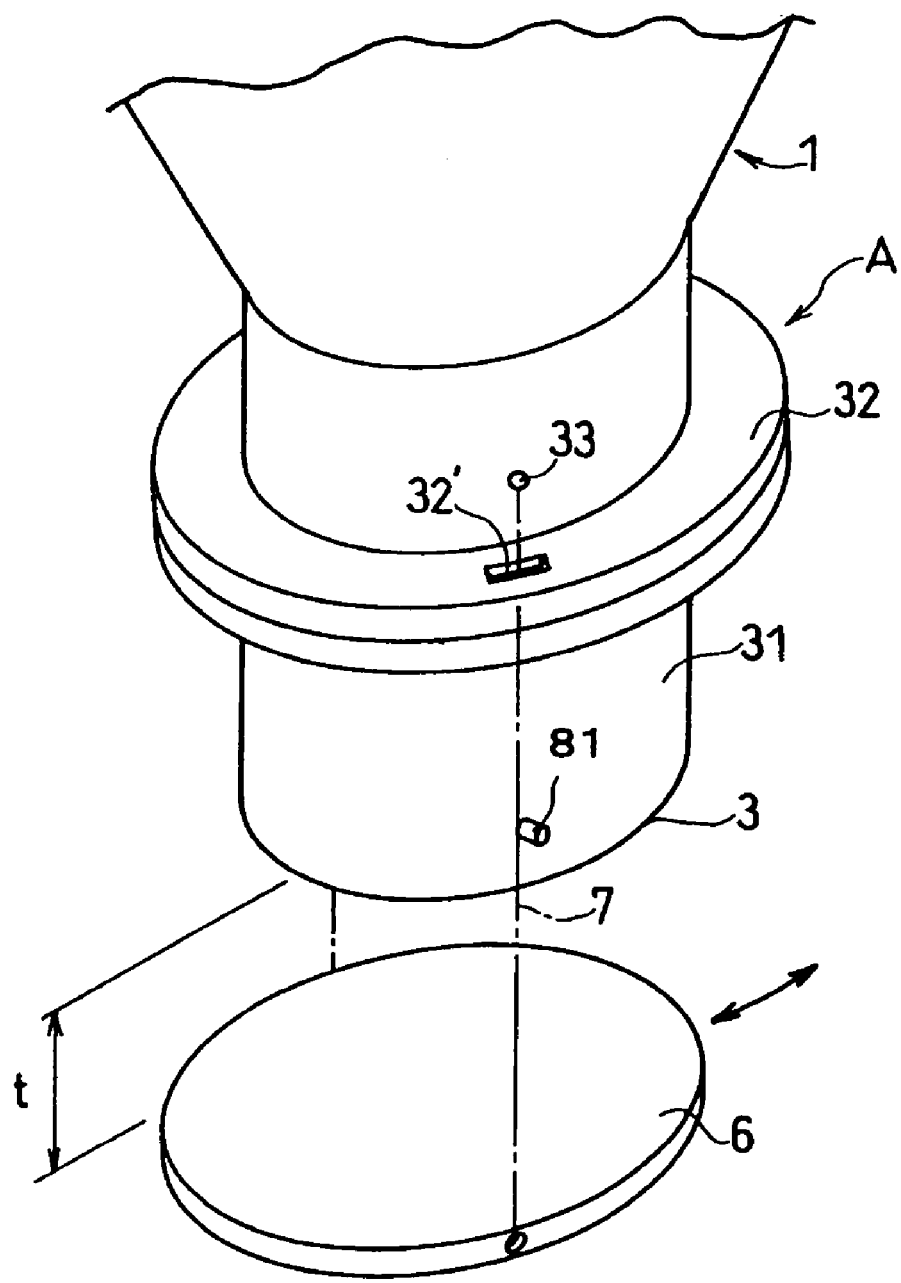
FIG. 2 is a diagrammatical perspective view of the part surrounded with broken lines of the suspension type damper unit of FIG. 1.
Figure 3:
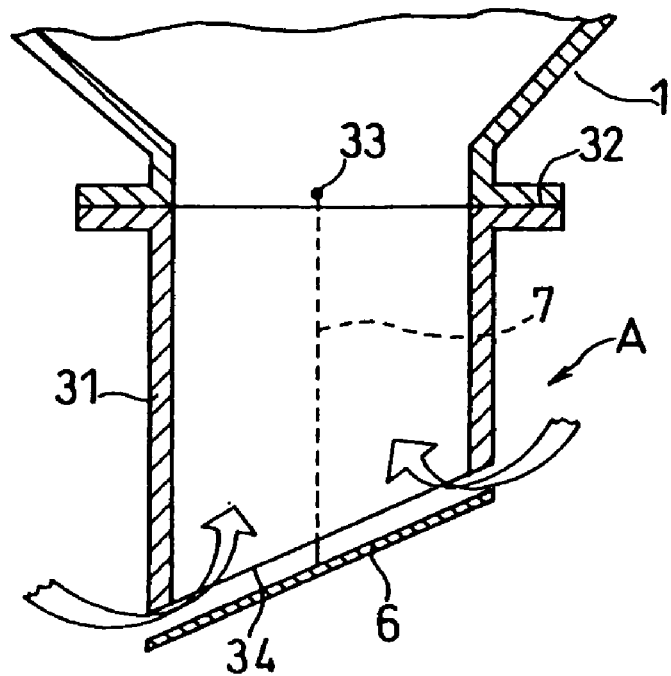
FIG. 3a and FIG. 3b are enlarged views of the essential part of the suspension type damper unit A of FIG. 1 in order to explain the operation.
Figure 3:
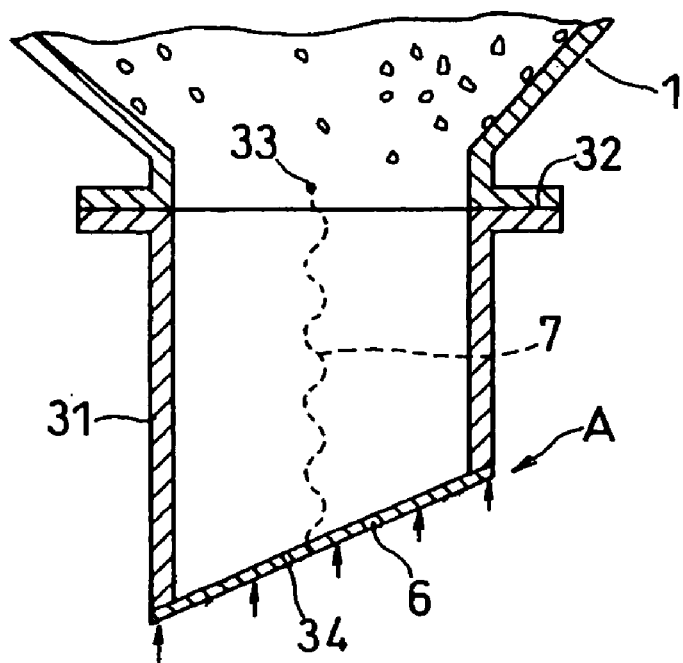
Figure 4:
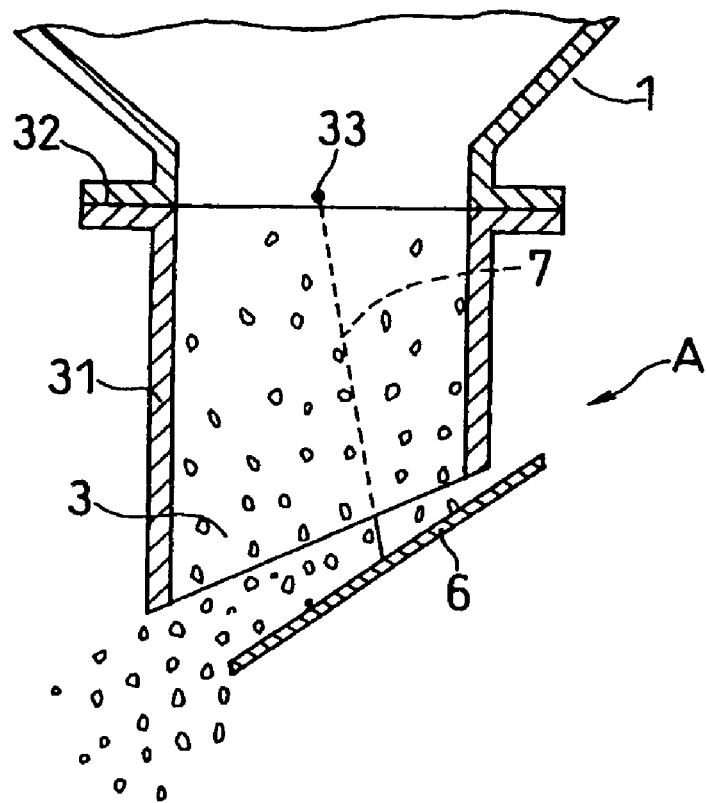
FIG. 4c and FIG. 4d are enlarged views of the essential part of the suspension type damper unit A of FIG. 1 in order to explain the operation.
Figure 4:
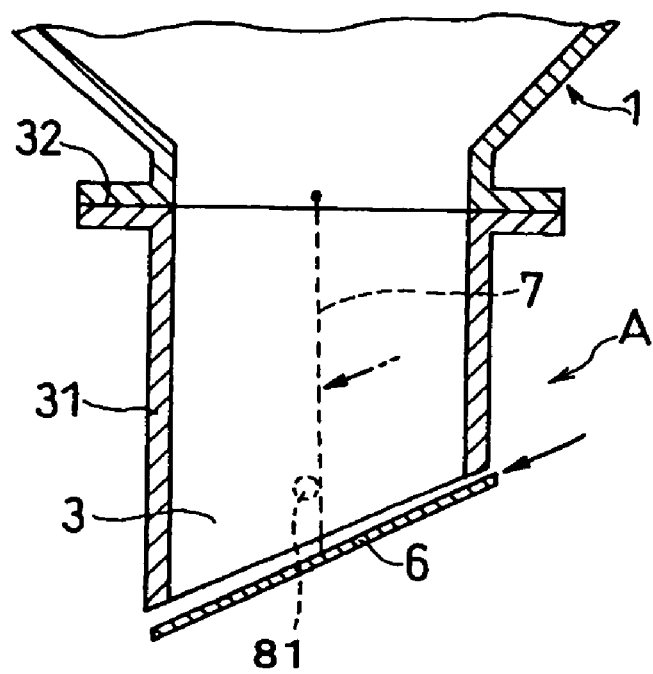

FIG. 1 is a diagrammatical whole sectional view showing one embodiment of a suspension type damper unit A and a suction type powder collector B according to the present invention. FIG. 2 is a diagrammatical perspective view of the part surrounded with broken lines of the suspension type damper unit A of FIG. 1.

The suction type powder collector B has a material supply port 2 at the upper part of a collector body 1 and a material discharge port 3 at its lower part and has a suspension type damper unit A of the present invention under the material discharge port 3. The collector B is constructed such that the material discharge port 3 is closed by the suspension type damper unit A, a powered or granular material (not shown) is suck from the material supply port 2 by operating the suction force with a blower through an air suction port 4, so that the powdered or granular material is stored in the collector body 1.

Each member is explained hereinafter.

The collector body 1 is comprised of a tubular portion 11 with an open upper end and a cover 13 detachably connected by means of a connection member 12 at the upper end.

The tubular portion 11 is formed such that its lower end is gradually tapered so as to smoothly collect the powdered or granular material into the material discharge port 3 at its end.

The material supply port 2 is formed at the upper side wall of the tubular portion 11 and a material supply pipe 21 is connected to the material supply port 2 to supply the powdered or granular material therethrough.

The air suction port 4 is opened at the top of the cover 13 and an air suction unit such as a blower (not shown) is connected to the air suction port 4 via an exhaust pipe 41.

The powdered or granular material means such material that powder, granule, minute flake, and short fiber and so on, however, in this embodiment, it means a powdered or granular material for resin.

The suspension type damper unit A for opening and closing the material discharge port 3 is provided at the lower end of the collector body 1.

The suspension type damper unit A has a cover plate 6 at a waiting position with a space "t" from the lower end of the material discharge port 3 and has a suspension member 7 for suspending and supporting the cover plate 6 from the suction type powder collector A.

The cover plate 6 is preferably made of a metal plate or a synthetic resin plate and the shape and size are designed to close the material discharge port 3. The weight is designed to be lifted up by the suction force of the blower to close the material discharge port 3.

If the surface of the cover plate 6 is blown with antistat or the cover plate 6 is made of an antistat material, the powdered or granular material is prevented from attaching on the cover plate 6 by the static electricity caused by the powdered or granular material and the cover plate, so that the cover plate 6 does not bite the powdered or granular material when being closed.

The space "t" is adjusted to be several millimeters or several centimeters depending on the kinds and size of the powdered or granular material, however, it is preferably not more than 10 mm in this embodiment.

Although the space "t" is shown wide in FIG. 2 for easy drawing, the space "t" may be designed in such a manner that the cover plate 6 is lifted up by the suction force operated by the blower from the air suction port 4 to close the material discharge port 3.

The suspension member 7 is comprised of two wires or cords made of a flexible material and each lower end of the suspension member 7 is fixed on an opposite position on the cover plate 6.

The suspension member 7 is provided outside of a material discharge pipe 31 constituting the material discharge port 3 and the upper end of the suspension member 7 is fixed with a stopper 33 via a through hole 32' formed on a flange 32 provided at the upper part of the material discharge pipe 31.

Because the suspension member 7 is positioned outside of the material discharge pipe 31, the suspension member 7 does not directly touch with the powdered or granular material. Therefore, discharge of the powdered or granular material is not disturbed by the member 7, foreign materials are not contaminated in the material and malfunction is not caused.

The cover plate 6 is suspended and supported with the suspension member 7 while the space "t" is formed under the material discharge port 3, so that the cover plate 6 is moved into one direction because of the falling load of the powdered or granular material when the material is charged from the upper part of the cover plate 6 and the cover plate 6 is returned at its designated position after the material is discharged, thereby achieving a pendulum structure.

The suspension type damper unit A and the suction type powder collector B of the present invention are simply constructed such that the cover plate 6 is suspended and supported by the suspension member 7 so as to have a fixed space "t" between the cover plate 6 and the material discharge port 3, thereby achieving a small and light weight apparatus.

Further according to such a simple structure, broken elements are reduced and the mechanical malfunctions caused by the open and close operations of the cover plate 6 are also reduced and prevented.

In the embodiment of the present invention, a lower end 34 of the material discharge port 3 is inclined and the cover plate 6 is also inclined so as to be suspended and supported with the space "t" along the lower end 34.

According to such a structure, the powdered or granular material applies larger loads on the lower side of the inclination (left in the figure), so that the cover plate 6 moves from the lower side (left in the figure) to the upper side (right in the figure) to be evacuated.

Therefore, the moving direction of the cover plate 6 is specified and the discharging direction and discharging position of the powdered or granular material are also specified.

The moving direction of the cover plate 6 is specified by the inclination in the present embodiment, however, the direction may be specified by changing the fixing position of the lower end of the suspension member 7 and the cover plate 6.

Next, the operations of the suspension type damper unit A and the suction type powder collector B are explained.

FIG. 3a, FIG. 3b, FIG. 4a and FIG. 4b are enlarged views of the essential part of the suspension type damper unit A of FIG. 1 and FIG. 2.

The operations are explained referring to FIG. 1, FIG. 2, FIG. 3 and FIG. 4 and the same members as those in FIG. 1 and FIG. 2 have the same reference numerals to omit their explanations.

The cover plate 6 is at its waiting position having a fixed space "t" under the material discharge port 3 by means of the suspension member 7 as mentioned in above before the air suction unit (not shown) is operated and the powdered or granular material is not stored in the collector body 1 (see FIG. 1, FIG. 2, and FIG. 3a).

Then, suction air is operated on the air suction port 4 by means of the air suction unit (not shown), the inside pressure of the collector body becomes negative, the powdered or granular material is supplied in the collector body 1 from the material supply port 2 through the material supply pipe 21, and the suction air is circulated in the exhaust pipe 41 via a filter 14 (see FIG. 1, FIG. 2, and FIG. 3a).

The suspension member 7 suspending and supporting the cover plate 6 of the suspension type damper unit A is flexed by the pressure difference with the collection body 1, and further the cover plate 6 is lifted up, so that the cover plate 6 airtightly closes the material discharge port 3 (see FIG. 3a and FIG. 3b).

Immediately after being negative pressure, the atmospheric air is suck through the space "t", so that the powdered or granular material is suck even when the material attaches between the material discharge port 3 and the cover plate 6.

Therefore, the material is prevented from being caught in the space "t" and the material discharge port 3 is surely closed (see FIG. 3a and FIG. 3b).

When the material which is hardly flexed is used for the suspension member 7, the closing time of the cover plate 6 is somehow delayed after being negative pressure in the collector body 1, so that the suction time becomes long to surely prevent the powdered or granular material from being caught between the material discharge port 3 and the cover plate 6.

When the material discharge port 3 is closed by means of the suction force applied to the cover plate 6, the powdered or granular material is suck from the material supply port 2 into the collector body 1 and a fixed amount of material is stored in the collector body 1.

When the fixed amount of powdered or granular material is stored in the collector body 1, material supply is stopped by a level sensor 5 provided for the collector body 1 and further the operation of the air suction unit (not shown) is stopped or released.

Then the load of the falling powdered or granular material stored in the collector body 1 is applied to the cover plate 6 to open the material discharge port 3 which has been closed and to make the suspension member 7 strain.

The powdered or granular material falls by the gravity from the material discharge port 3 to be discharged. At this time, the cover plate 6 swings in one direction (right in the figure) by the falling load of the material and is evacuated at an open position (see FIG. 1, FIG. 2 and FIG. 4c).

The falling load of the powdered or granular material is gradually reduced accompanied with the discharge of the stored material, so that the cover plate 6 at the open position gradually returns its designated position from the open position by the theory of pendulum.

If the stopper 81 for regulating the oscillation of the suspension member 7 is provided at the waiting position of the suspension member 7 at the lower part of the material discharge pipe 3, the oscillation time when the cover plate 6 returns is reduced, so that the cover plate 6 can be quickly stopped at the waiting position and its return efficiency can be improved (see FIG. 4d).

Embodiment 2

Figure 5:
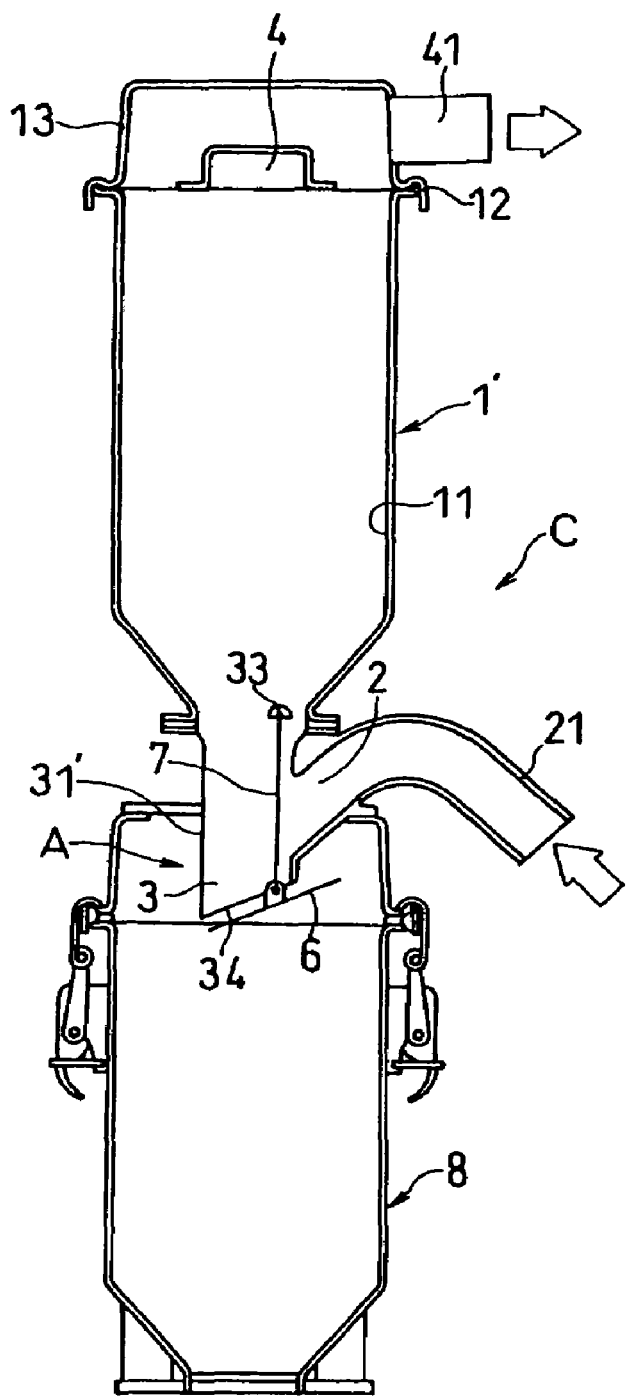
FIG. 5 is a diagrammatical whole sectional view showing one embodiment of a suspension type damper unit A and an air mixing suction type powder collector C according to the present invention.

FIG. 5 is a diagrammatical whole sectional view showing one embodiment of a suspension type damper unit A and an air mixing suction type powder collector C according to the present invention.

In the figure, the air mixing suction type powder collector C attached with a suspension type damper unit A is shown.

The same members as those in FIG. 1-FIG. 4 have the same reference numerals and their explanations are omitted.

According to the air mixing suction type powder collector C, a material mixing chamber 1' having an air suction port 4 at its upper part and a material discharge port 3 at its lower part and a material storage chamber 8 are connected by a connection pipe 31' provided with a material supply port 2. A powdered or granular material supplied from the material supply port 2 is mixed with air in the material mixing chamber 1' by the suction force operated on the air suction port 4, a fixed amount of material is stored in the material mixing chamber 1' and the suspension type damper unit A is operated as mentioned above (see FIG. 2 and FIG. 3), so that the material stored in the material mixing chamber 1' is transferred to the material storage chamber 8.

Such a suspension type damper unit A and an air mixing suction type powder collector C can be simply constructed as mentioned in the preferred embodiment 1 in which the cover 6 is suspended and supported by the suspension member 7 so as to have the space "t" between the cover plate 6 and the material discharge port 3, so that the air mixing suction type powder collector C can be made compact and light weight.

Further according to the simple structure, the broken elements are reduced, and the mechanical malfunctions caused by the open and close operations of the cover plate 6 are prevented.

Therefore, the present invention can be effectively used as a suspension type damper unit, a suction type powder collector and an air mixing suction type powder collector.

The invention claimed is:

1. A suspension type damper unit having a cover plate which is suspended with a suspension member at a material discharge port of a collection body so as to form a specified space for the material discharge port,
   wherein said cover plate closes said material discharge port by receiving suction force by which powdered material is fed into said collection body and opens said material discharge port by receiving the weight of the powdered material when a specified amount of powdered material is stored in said collection body.

2. The damper unit according to claim 1,
   wherein said material discharge port has an inclined lower edge and wherein said cover plate is suspended aslope along said lower edge.

3. The damper unit according to claim 1,
   wherein a stopper member for regulating swing movement of said suspension member is provided in said material discharge port.

4. A suction type powder collector comprising a collector body having an air suction port, a material supply port and a damper unit provided at a material discharge port at the lower part of said collector body,
   wherein said damper unit has a cover plate which is suspended with a suspension member at said material discharge port so as to form a specified space for said material discharge port, and
   wherein said cover plate closes said material discharge port by the suction force by which powdered material is fed into said collection body and opens said material discharge port by the weight of the powdered material when a specific amount of powdered material is stored in said collection body.

5. The suction type powder collector according to claim 4,
   wherein said material discharge port has an inclined lower edge and wherein said cover plate is suspended aslope along said lower edge.

6. The suction type powder collector according to claim 4,
   wherein a stopper member for regulating swing movement of said suspension member is provided in said material discharge port.

7. An air mixing suction type powder collector comprising:
   a material mixing chamber having an air suction port at its upper part and a material discharge port at its lower part, a material storage chamber and a communicating pipe for connecting said material mixing chamber to said material storage chamber, in which a damper unit is provided at said material discharge port and a powdered material fed through said material supply port by suction force acting on the air suction port is stored by the specified amount in said material mixing chamber while the powdered material is mixed with air in said material mixing chamber and thereafter is transferred into said material storage chamber by opening said damper unit, and
   wherein said damper unit has a cover plate which is suspended with a suspension member at said material discharge port of said material mixing chamber so as to form a specified space for said discharge port, and
   said cover plate closes said material discharge port by the suction force by which powdered material is fed into said collection body and opens said material discharge port by the weight of the powdered material when a specific amount of powdered material is stored in said collection body.

8. The air mixing suction type powder collector according to claim 7,
   wherein said material discharge port has an inclined lower edge and wherein said cover plate is suspended aslope along said lower edge.

9. The air mixing suction type powder collector according to claim 7,
   wherein a stopper member for regulating swing movement of said suspension member is provided in said material discharge port.

* * * * *